United States Patent [19]

Rines

[11] 4,414,471
[45] Nov. 8, 1983

[54] FIBER OPTIC ACOUSTIC SIGNAL TRANSDUCER USING REFLECTOR

[75] Inventor: Glen A. Rines, Brookline, N.H.

[73] Assignee: Sanders Associates, Inc., Nashua, N.H.

[21] Appl. No.: 371,398

[22] Filed: Apr. 26, 1982

Related U.S. Application Data

[60] Division of Ser. No. 209,441, Nov. 24, 1980, abandoned, which is a continuation-in-part of Ser. No. 138,385, Apr. 8, 1980, abandoned.

[51] Int. Cl.³ .................................................. G02B 5/14
[52] U.S. Cl. ...................................... 250/227; 73/655; 350/96.10
[58] Field of Search ............................ 250/227, 231 R; 350/96.10, 96.20; 73/655, 653

[56] References Cited

U.S. PATENT DOCUMENTS 4,300,813 11/1981 Gravel .............................. 350/96.10

*Primary Examiner*—David C. Nelms
*Assistant Examiner*—Darwin R. Hostetter
*Attorney, Agent, or Firm*—Louis Etlinger; Richard I. Seligman

[57] ABSTRACT

Sensing of acoustic waves is achieved by providing spaced apart stationary and cantilevered optic fibers whereby inertial forces created by acoustic signals modulate an optical signal carried by the fibers through vibration of the cantilevered fiber.

11 Claims, 8 Drawing Figures

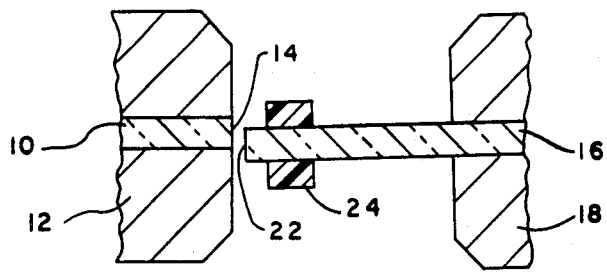
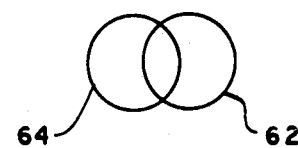
FIG. 5  FIG. 6
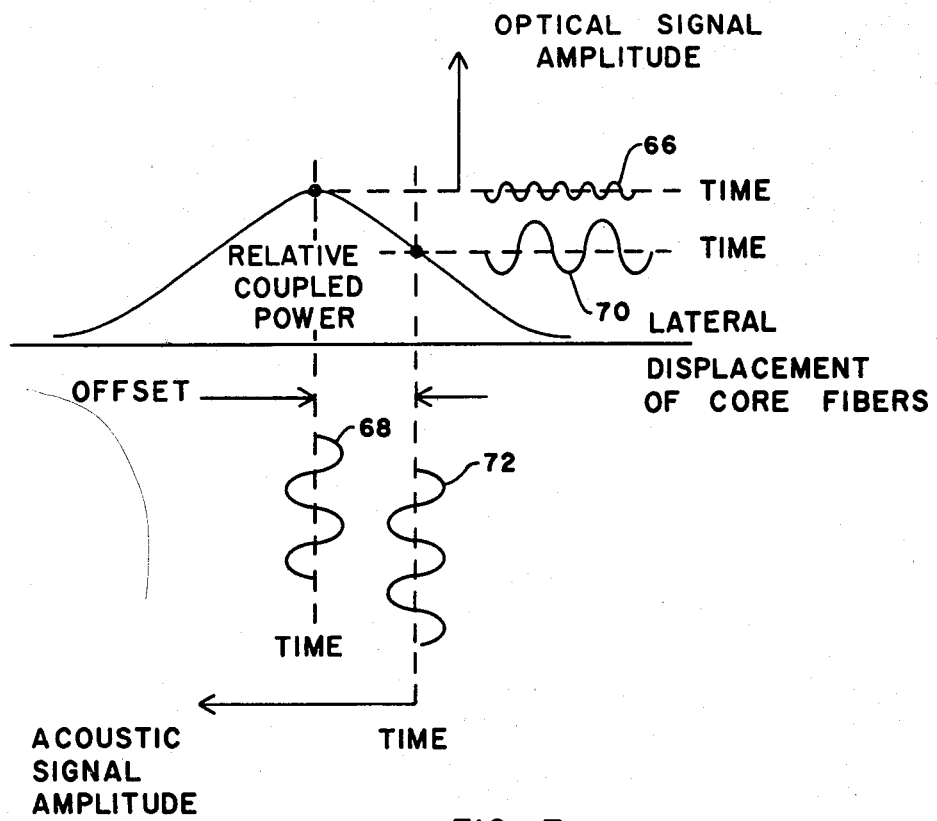
FIG. 7
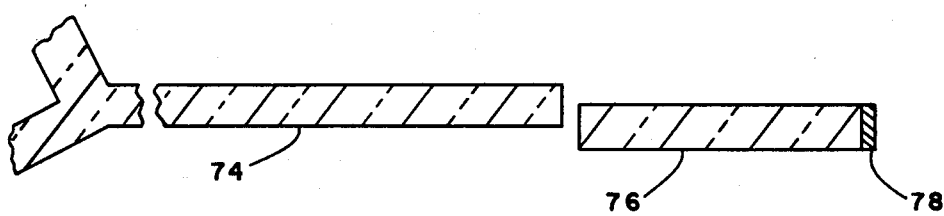
FIG. 8

FIBER OPTIC ACOUSTIC SIGNAL TRANSDUCER USING REFLECTOR

This is a division of application Ser. No. 209,441, filed Nov. 24, 1980, now abandoned, which is a continuation-in-part of my application Ser. No. 138,385, filed Apr. 8, 1980 now abandoned.

BACKGROUND OF THE INVENTION

This invention relates to acoustic transducers and more particularly to fiber optic acoustic transducers.

There are many requirements for sensing and measuring acoustic waves, including hydrophones which are employed to sense the noise generated by ships and submarines in the ocean. In order to cover large areas of the ocean huge quantities of hydrophones must be employed. It is thus important that the cost of the hydrophones be kept to a minimum and that the sensitivity thereof be maximized.

In order to meet these requirements, extensive investigation has been undertaken in looking at new technology which may be applicable, including fiber optics. One proposed fiber optic transducer operates on the principle of utilizing change in fiber density or length to produce optical signal phase shifts. In this transducer the fiber undergoes a change in density due to incident acoustic waves which results in a change in refractive index such that any input signal applied thereto will be shifted in phase. Measurement of the acoustic waves is thus accomplished by comparing the phase shifted signal with a reference. This type of transducer, however, has many drawbacks including the requirement that the input signal thereto be coherent and, of course, coherent sources are both expensive and complex. Detection of the acoustic waves in this manner is also costly and complex in that relatively complex phase shift measurements must be made.

Accordingly, it is an object of this invention to provide an acoustic signal transducer which is relatively simple in construction and requires minimum processing of its output signals.

SUMMARY OF THE INVENTION

Briefly, in one embodiment an inexpensive, relatively simple, sensitive acoustic signal transducer is achieved by providing a pair of spaced apart optical fibers wherein one of the optical fibers is stationary and the other forms a cantilevered beam. Acoustic waves incident on the housing containing the optical fibers will occasion inertial forces which will cause vibration of the cantilevered optical fiber such that an optical signal transmitted by the optical fibers will be amplitude modulated and, hence, measurement of the acoustic waves is made by measuring such amplitude modulation.

BRIEF DESCRIPTION OF THE DRAWINGS

The above-mentioned and other features and objects of this invention will become more apparent by reference to the following description taken in conjunction with the accompanying drawings, in which:

FIG. 5 is a cross-sectional view of the optical fibers of FIG. 1 but having them offset;

FIG. 6 is a diagram illustrating an optical offset for the embodiments of FIGS. 3 and 4;

FIG. 7 is a graph illustrating how the sensitivity of the sensors of FIGS. 1-4 is improved by providing misalignment as shown in FIGS. 5 and 6; and FIG. 8 is a cross-sectional view of a further embodiment of a fiber optic acoustic signal transducer.

DESCRIPTION OF PREFERRED EMBODIMENTS

Figure 1:
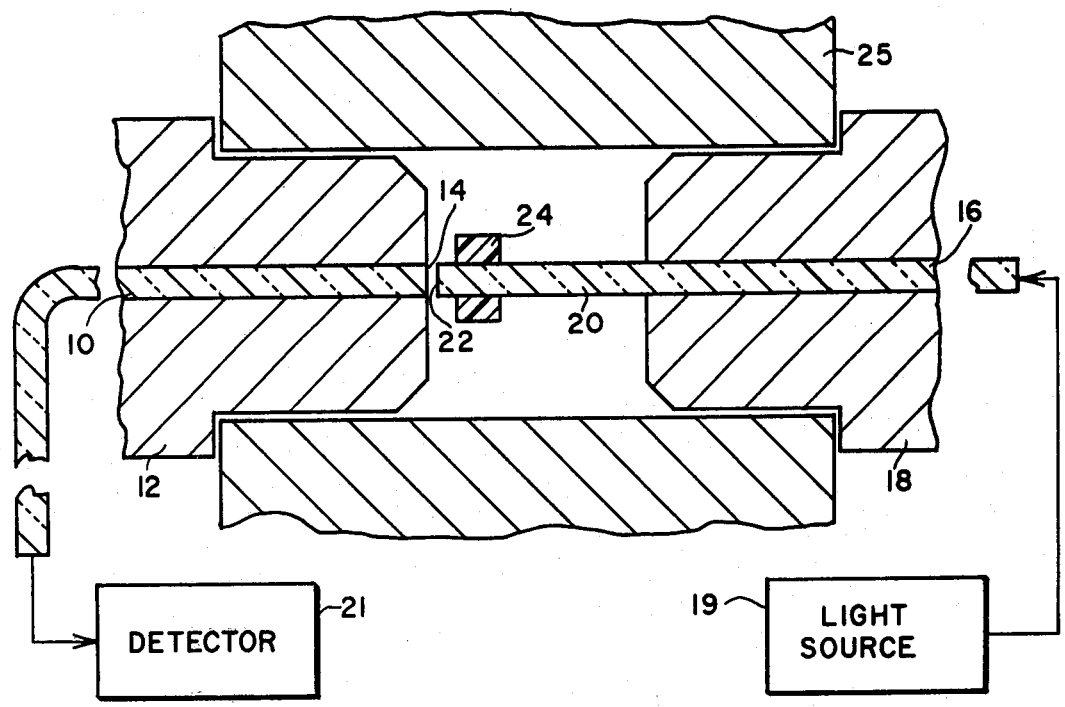
FIG. 1 is a partial cross-sectional view of a fiber optic acoustic signal transducer.

Referring now to FIG. 1 of the drawings, there is illustrated thereby a first embodiment of the invention for a fiber optic acoustic signal transducer. The principal components of the fiber optic acoustic signal transducer include a first optical fiber 10 disposed within a connector 12 or other similar component such as a ferrule. Optical fiber 10 is secured in connector 12 in such a manner that it will remain stationary within and will not deflect or vibrate from the application of acoustic waves to the sensor. The internal end 14 of fiber optic 10 is cleaved or polished in conventional fashion.

A second optical fiber 16 is mounted within a second connector 18 axially aligned with fiber 10; however, it is mounted in such a fashion that a portion thereof protrudes from the connector to form a cantilevered beam 20. The end 22 of fiber 16 is also cleaved or polished in conventional fashion. An alignment sleeve 25 is employed to maintain a predetermined spacing between the ends 14 and 22 of optical fibers 10 and 16, respectively. The entire sensor is disposed within a sealed housing which is not shown for purposes of clarity. The principle requirement of the housing is that it will not dampen any acoustic waves which it encounters.

When acoustic waves are incident on the housing in which the sensor is mounted, these waves will cause the cantilevered beam portion 20 of optical fiber 16 to vibrate due to the inertial forces imposed thereon.

The object of the invention is to sense and measure the acoustic waves by measuring the inertial forces imposed on the cantilevered beam 20. This is done by applying light to one end of the fibers 10 or 16, for example, by applying the output of light source 19 to fiber 16 and then detecting that light at the other end of the fiber, in this case fiber 10, by a detector 21. While the term light is used throughout this specification, it is to be understood that the term includes both the visible and invisible and includes all wavelengths which can be transmitted by the optical fibers. One typical light source is a laser diode which can be coupled to fiber 16 in conventional fashion. The amount of light detected will depend upon the inertial forces imposed on the cantilevered beam 10. These inertial forces will occasion amplitude modulation of the light applied to the optical fiber 16 and detected by the optical fiber 10.

One principle use of such a sensor is as a hydrophone within the ocean. In this application the fiber 10 will be relatively long so that it extends to any recording and analysis or processing equipment which for example, may be significantly above the hydrophone, for example, floating in a buoy on the surface of the water. While only one sensor is illustrated, a plurality of them may be connected together to form an array as is well known.

The spacing between the ends 14 and 22 of fibers 10 and 16 are preferably positioned as close as possible to maximize coupling between the fibers. However, they are maintained far enough apart so that they will not touch during thermal expansion which might take place. In the ocean environment for hydrophone applications, the temperature will not vary significantly and the thermal expansion problems are minimal. In environments where thermal problems may be significant, the embodiment of FIG. 2, to be described hereinafter, is preferred. Preferably the ends of the fibers are also tapered to increase sensitivity.

The cantilevered beam 20 may be loaded using a mass-loading member 24 to insure that the resonant frequency of cantilevered beam 20 is less than the expected frequencies to be encountered. The exact point of resonance can be optimized by varying the fiber geometry or by mass loading. Member 24 may be cemented to the fiber or instead of bead of epoxy may be used as the member.

Figure 2:
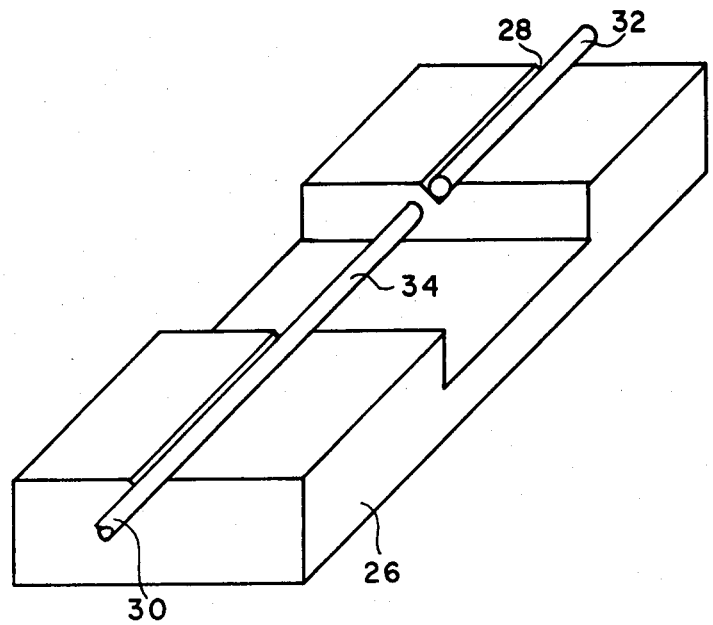
FIG. 2 is a perspective view of a fiber optic acoustic signal transducer similar to that of FIG. 1, but employing a different fiber holding member.

Another embodiment similar to that of FIG. 1 is shown in FIG. 2 of the drawings. In this embodiment, the fibers are maintained within a block 26 having a V-groove 28 therein. The fibers are secured in block 26 with epoxy or other glass/metal bonding adhesive. Again the fibers 30 and 32 are maintained as close as possible so as to maximize coupling therebetween. The block 26 is preferably made of a material such as Invar because its low coefficient or thermal expansion nearly matches that of glass fibers. For the hydrophone application, block 26 would be fixed inside a sealed housing, which is rigid and moves with water particles. It should also be neutrally buoyant for maximum sensitivity. Such a housing will be responsive to acoustic waves incident thereon so as to cause the cantilevered end 34 of fiber 30 to vibrate and thus, amplitude modulate any light applied between the fibers.

Figure 3:
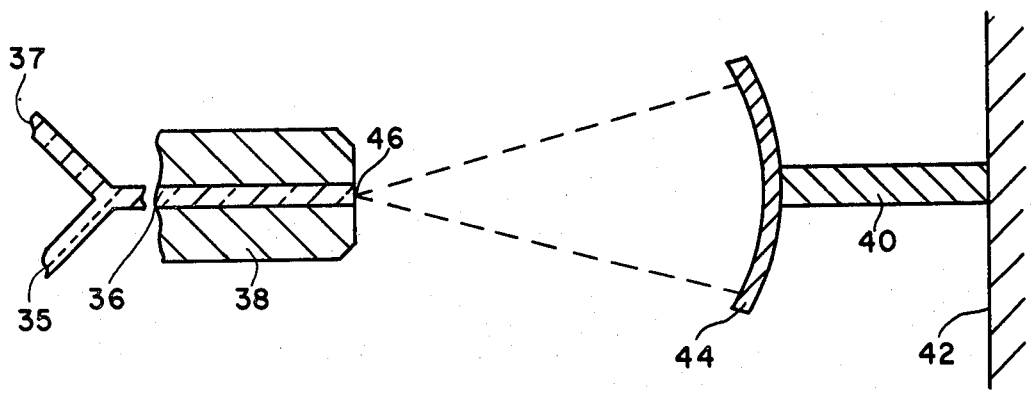
FIG. 3 is a partial cross-sectional view of an alternative fiber optic acoustic signal transducer requiring only a single optic fiber.

An alternate embodiment of the invention is illustrated in FIG. 3 of the drawings wherein only a single bidirectional bus optical fiber 36 is required. Fiber 36 is mounted in a connector or similar holding device 38. This sensor also includes a cantilevered beam 40 mounted at the far end to a wall or other rigid structure 42 and having a reflective member 44 at the free end thereof. Reflective member 44 is preferably a concave mirror. The end 46 of optical fiber 36 is disposed at the center of the sphere of which the mirror surface 44 is a section. Light inputted to fiber 36 at 35 will be reflected from the mirror 44, received by the fiber and applied to a detector at 37. When acoustic waves are incident on the transducer they will cause vibration of the cantilevered beam 40 due to inertial forces. Mirror 44 attached to the beam 40 will also vibrate and amplitude modulate the light received by the mirror and returned to the fiber 36.

Figure 4:
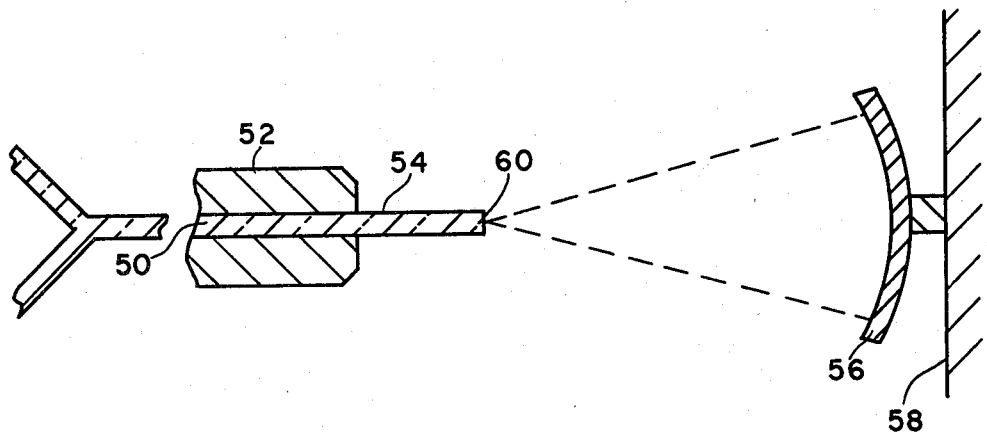
FIG. 4 is a partial cross-sectional view of an alternative fiber optic acoustic signal transducer similar to that of FIG. 3 in that it requires only a single optical fiber.

In an alternate embodiment of that of FIG. 3, the optical fiber constitutes the cantilevered beam and the reflective member is stationary. This is shown in FIG. 4 wherein an optical fiber 50 is mounted within a connector or other appropriate holding member 52. The fiber 50 is mounted within connector 52 so that a portion thereof protrudes from the connector 52 to form a cantilevered beam 54. In this embodiment a reflective member 56 is mounted to wall 58 in such a manner that it will not vibrate upon the application of inertial forces. The end 60 of fiber 50 is disposed at the center of the sphere of which the reflective member surface is a section.

In order to achieve omnidirectional sensing, three sensors can be placed within a single housing having orthogonal sensitivity. These sensors would provide amplitude and frequency information along mutually perpendicular axes that can then be resolved into the resultant quantities for both amplitude and frequency. The coupling characteristics of each sensor would be set to be linear in the direction of desired sensing and flat or non-responsive in the perpendicular direction. This is achieved by offsetting the fiber axes slightly. For small dynamic displacements relative to the fiber core diameter, this can be achieved.

This linearity and accompanying sensitivity is achieved in the embodiments of FIGS. 1 and 2 by providing that stationary optical fibers 10,32 are offset or misaligned with respect to the cantilevered optical fibers 16,30. This is illustrated in FIG. 5 of the drawings wherein it is clearly shown that the ends 14,22 of the fibers 10,16 are offset. The greater sensitivity employing the offset is illustrated by the curve of FIG. 7 wherein it is shown that by offsetting the fibers, the transfer function is more linear than without such offset and, thus, provides much greater sensitivity. Curve 66 represents the optical output of the sensor with no offset when acoustic input 68 is applied thereto, while curve 70 represents the optical output of a sensor having an offset when acoustic input 72 is applied thereto. Note that without the offset, the output is smaller in magnitude and at twice the frequency of the input. Offset is desirable in many applications both for omnidirectional and directional sensors.

The offset is also desirable for the embodiments of FIG. 3 and 4 in order to achieve greater sensitivity. This is illustrated in FIG. 6 of the drawings. In FIG. 6 there is illustrated two circles 62,64. Circle 62 represents the core of optical fibers 46 and 60 of FIGS. 3 and 4, respectively and circle 64 represents the light spots from reflective members 44 and 56 of FIGS. 3 and 4, respectively, when no acoustic waves are incident upon the sensors.

An alternative embodiment to that of FIGS. 3 and 4 is illustrated in FIG. 8. This embodiment employs two optical fibers 74,76. Optical fiber 76 has a reflective surface 78 at one end thereof, such that it acts like the reflective surfaces 40 and 56 of FIGS. 3 and 4. The surface 78 need not be curved like that of the embodiments of FIGS. 3 and 4 since the fiber itself provides confinement of the light energy. In this embodiment optical fiber 74 is stationary and optical fiber 76 is cantilevered like the embodiment of FIG. 3. Alternatively, optical fiber 76 may be stationary and optical fiber 74 cantilevered as in the embodiment of FIG. 4. The cantilevered beam fiber, whether fiber 74 or 76, would employ a mass-loading member like member 24 of FIG. 1. Preferably, the axes of the fibers 70,72 are offset as shown. This embodiment has some advantages over that of FIGS. 3 and 4 in that the two optical fibers will have similar optical characteristics rather than employing different optical elements of differing characteristics. This embodiment is also easy to implement since the reflective surface 78 may be readily applied to the end of optical fiber 76 by, for example, a deposition of metal.

Although the invention has been described in its use as a hydrophone, the principle applies to any application for measuring acoustic waves as, for example, a sensor for seismic vibrations for an intruder alarm system. The principles apply to vibration monitoring and other accelerometer applications. Thus, it is to be understood that the embodiments shown are illustrative only, and that many variations and modifications may be made without departing from the principles of the invention herein disclosed and defined by the appended claims.

I claim:

1. Apparatus for sensing acoustic signals, comprising:
   an optical fiber;
   means for applying light to said optical fiber;
   a reflective member displaced from said optical fiber;
   means coupled to said optical fiber for detecting light incident on said reflective member from said optical fiber and reflected back to said optical fiber from said reflective member; and
   a cantilevered beam responsive to acoustic signals to alter the path of light between said reflective member and said optical fiber.

2. Apparatus for sensing acoustic signals, comprising:
   a stationary optical fiber; and
   a cantilevered beam substantially aligned with said optical fiber and having a reflective member affixed to the free end thereof so that the amount of light from said optical fiber incident on said reflective member will be returned to said optical fiber proportional to the vibration of said cantilevered beam occasioned by acoustic signals applied thereto.

3. Apparatus as defined in claim 2 wherein there is a slight misalignment between such optical fibers so that only a portion of the return light from said reflective mirror is received by said stationary optical fiber when no acoustic waves are incident upon said apparatus.

4. Apparatus as defined in claim 3 wherein said reflective member is a concave mirror.

5. Apparatus as defined in claim 2, wherein the end of said optical fiber is arranged near the center of a sphere of which said mirror is a section but displaced slightly therefrom.

6. Apparatus for sensing acoustic signals, comprising:
   a stationary reflective member; and
   an optical fiber arranged as a cantilevered beam so that light from said optical fiber incident on said reflective member will be returned to said optical fiber proportional to the vibration of said optical fiber occasioned by acoustic signals applied thereto.

7. Apparatus as defined in claim 4 wherein said reflective member is a concave mirror.

8. Apparatus as defined in claim 6 wherein the end of said optical fiber is arranged near the center of a sphere of which said mirror is a section but displaced slightly therefrom.

9. Apparatus for sensing acoustic signals, comprising:
   a first optical fiber;
   a second optical fiber spaced from said first optical fiber and having a reflective portion at one end thereof;
   said fibers being arranged such that the amount of light coupled from said first fiber to said second fiber and returned via said reflective portion will be proportional to the acoustic signals received at said apparatus.

10. Apparatus as defined in claim 9 wherein said first fiber is stationary and said second fiber comprises a cantilevered beam.

11. Apparatus as defined in claim 10 wherein said second fiber is stationary and said first fiber comprises a cantilevered beam.

* * * * *